United States Patent
Niu et al.

(10) Patent No.: US 12,193,053 B2
(45) Date of Patent: Jan. 7, 2025

(54) LISTEN BEFORE TALK SIGNALING AND CHANNEL OCCUPANCY TIME SHARING

(71) Applicant: Apple Inc., Cupertino, CA (US)

(72) Inventors: Huaning Niu, San Jose, CA (US); Seyed Ali Akbar Fakoorian, San Diego, CA (US); Hong He, San Jose, CA (US); Yushu Zhang, Beijing (CN); Wei Zeng, Saratoga, CA (US); Dawei Zhang, Saratoga, CA (US); Weidong Yang, San Diego, CA (US); Oghenekome Oteri, San Diego, CA (US); Chunxuan Ye, San Diego, CA (US); Haitong Sun, Cupertino, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 17/438,274

(22) PCT Filed: Aug. 4, 2021

(86) PCT No.: PCT/CN2021/110444
§ 371 (c)(1),
(2) Date: Sep. 10, 2021

(87) PCT Pub. No.: WO2023/010307
PCT Pub. Date: Feb. 9, 2023

(65) Prior Publication Data
US 2023/0276491 A1    Aug. 31, 2023

(51) Int. Cl.
*H04W 74/0808* (2024.01)
*H04W 72/232* (2023.01)
*H04W 74/00* (2009.01)

(52) U.S. Cl.
CPC ..... *H04W 74/0808* (2013.01); *H04W 72/232* (2023.01); *H04W 74/006* (2013.01)

(58) Field of Classification Search
CPC .......... H04W 74/0808; H04W 72/232; H04W 74/006; H04W 72/23
See application file for complete search history.

(56) References Cited

U.S. PATENT DOCUMENTS

2020/0187250 A1* 6/2020 Bhattad ............. H04W 74/0808
2021/0058964 A1* 2/2021 Hooli ................ H04W 74/0808
(Continued)

FOREIGN PATENT DOCUMENTS

CN    107949067 A    4/2018
CN    110115087 A    8/2019
(Continued)

OTHER PUBLICATIONS

International Search Report and Written Opinion for PCT/CN2021/110444; 9 pages; Apr. 7, 2022.
(Continued)

*Primary Examiner* — Chirag G Shah
*Assistant Examiner* — Joshua Smith
(74) *Attorney, Agent, or Firm* — Kowert, Hood, Munyon, Rankin & Goetzel, P.C.

(57) ABSTRACT

This disclosure relates to techniques for performing wireless communications including channel access procedures for a user equipment (UE) and a base station. Techniques for signaling channel access types, use of channel access, and other channel access parameters are disclosed.

18 Claims, 8 Drawing Sheets

(56) References Cited

U.S. PATENT DOCUMENTS

| | | | |
|---|---|---|---|
| 2021/0235496 A1 | 7/2021 | Park | |
| 2022/0201747 A1* | 6/2022 | Tooher | H04W 74/0808 |
| 2022/0408494 A1* | 12/2022 | Bhattad | H04W 72/23 |
| 2023/0015997 A1* | 1/2023 | Liu | H04W 72/23 |
| 2023/0156786 A1* | 5/2023 | Myung | H04W 74/0808 |
| | | | 370/329 |

FOREIGN PATENT DOCUMENTS

| | | | |
|---|---|---|---|
| CN | 112042251 A | 12/2020 | |
| CN | 112136353 A | 12/2020 | |

OTHER PUBLICATIONS

Samsung "Channel access mechanism for NR from 52.6 GHz to 71 GHz"; 3GPP TSG RAN WG1 #105-e R1-2105300; 10 pages; May 27, 2021.

Partial Supplementary Search Report for EP Patent Application No. 21899294.9; 18 pages; Oct. 12, 2022.

Lenovo et al. "Channel access mechanisms for NR from 52.6GHz to 71GHz"; 3GPP TSG RAN WG1 #105-e R1-2105498; 18 pages; May 10, 2021.

CAICT "Discussions for channel access mechanism for 52.6-71GHz"; 3GPP TSG RAN WG1 #104-e R1-2100301; 6 pages; Jan. 25, 2021.

* cited by examiner

LISTEN BEFORE TALK SIGNALING AND CHANNEL OCCUPANCY TIME SHARING

PRIORITY CLAIM INFORMATION

This application is a U.S. National Stage application of International Application No. PCT/CN2021/110444, filed Aug. 4, 2021, titled "Listen Before Talk Signaling and Channel Occupancy Time Sharing", which is hereby incorporated by reference in its entirety.

TECHNICAL FIELD

The present application relates to wireless communication, including to channel access techniques and related signaling.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be channel access in unlicensed spectrum communications, e.g., at frequencies above 52.6 GHz. Improvements in the field are desired.

SUMMARY

Embodiments are presented herein of, inter alia, systems, apparatuses, and methods for performing channel access and related communications in a wireless communication system, e.g., New Radio (NR), e.g., in frequencies above 52.6 GHz.

As noted above, the number of use cases for wireless networks communicating with different classes of user equipment devices (UEs) with widely variable capabilities and usage expectations are growing. One usage expectation may include communication in unlicensed spectrum, e.g., in frequencies above 52.6 GHz. Channel access techniques such as listen before talk (LBT) and others may be used in unlicensed spectrum to reduce and/or avoid collisions and interference. Devices may exchange configuration information and determine appropriate techniques and parameters for channel access.

In some embodiments, a user equipment (UE) may establish communication with a base station and exchange configuration information with the base station (BS) relevant to channel access. The BS may transmit and the UE may receive an uplink grant scheduling a first uplink transmission on at least a first part of a first channel. The UE may determine, based on the configuration information, a unit bandwidth. The UE may perform a LBT procedure using the unit bandwidth on the first channel and may determine that the LBT procedure is successful on at least a first portion of the first channel, wherein the first portion of the first channel has a bandwidth equal to the LBT unit bandwidth. In response to the determination that the LBT procedure is successful on at least the first portion of the first channel, the UE may transmit, to the base station, the first uplink transmission at least in part on the first portion of the first channel.

In some embodiments, a user equipment (UE) may establish communication with a base station (BS) and receive, from the base station, configuration information. The BS may transmit and the UE may receive, one or more downlink control information (DCI) messages, comprising: a downlink grant; and an uplink grant. The UE may determine whether resources for transmission according to the uplink grant occur within a same channel occupancy time (COT) as resources for reception according to the downlink grant. The UE may receive, from the base station, a downlink transmission according to the downlink grant. The UE may determine whether to perform a listen before talk (LBT) procedure prior to performing transmission according to the uplink grant, wherein the determination of whether to perform the LBT procedure is based on one or more of: the determination of whether the resources for transmission according to the uplink grant occur within the same COT as the resources for reception according to the downlink grant; the configuration information; one or more indication in one of the one or more DCI messages; and an amount of time between the resources for reception according to the downlink grant and the resources for transmission according to the uplink grant. The UE may transmit, to the BS, an uplink transmission according to the uplink grant.

In some embodiments, a BS may establish communication with a user equipment (UE) and perform a listen before talk (LBT) procedure. The BS may determine that the LBT procedure indicates that at least a first portion of a channel is clear, and, in response to the determination that at least the first portion of the channel is clear, transmit, to the UE, on the first portion of the channel, a downlink communication. The BS may transmit, to the UE, a downlink control information (DCI) message scheduling an uplink communication and indicating that the first portion of the channel is clear. The BS may receive, from the UE, the uplink communication on the first portion of the channel.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™) portable gaming devices (e.g., Nintendo DS™, PlayStation Portable™, Gameboy Advance™ iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
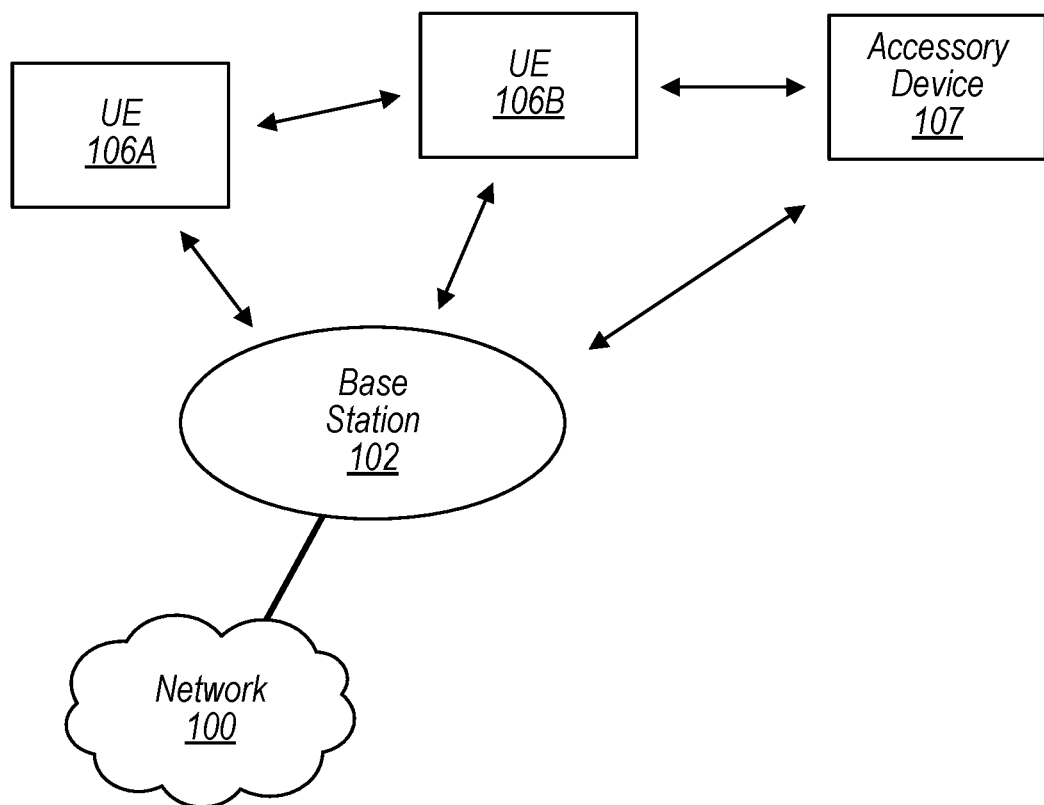
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
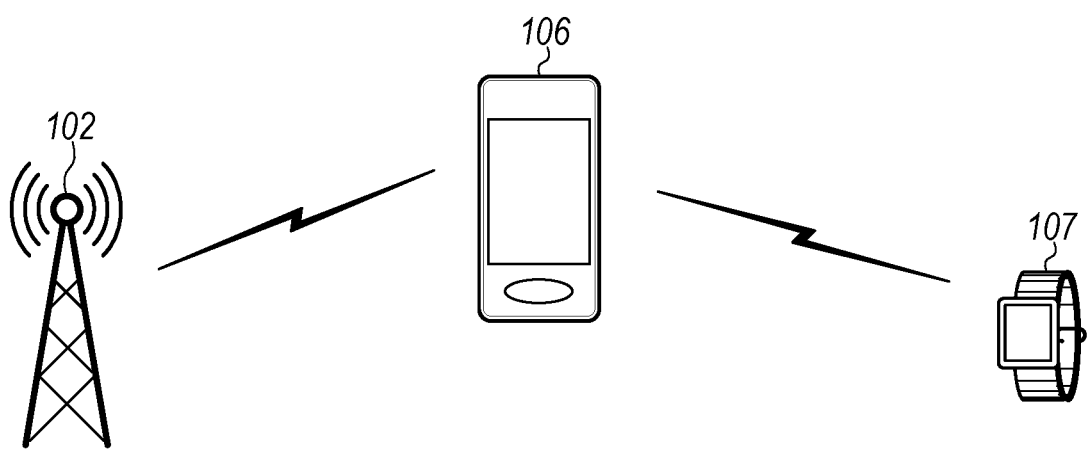
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
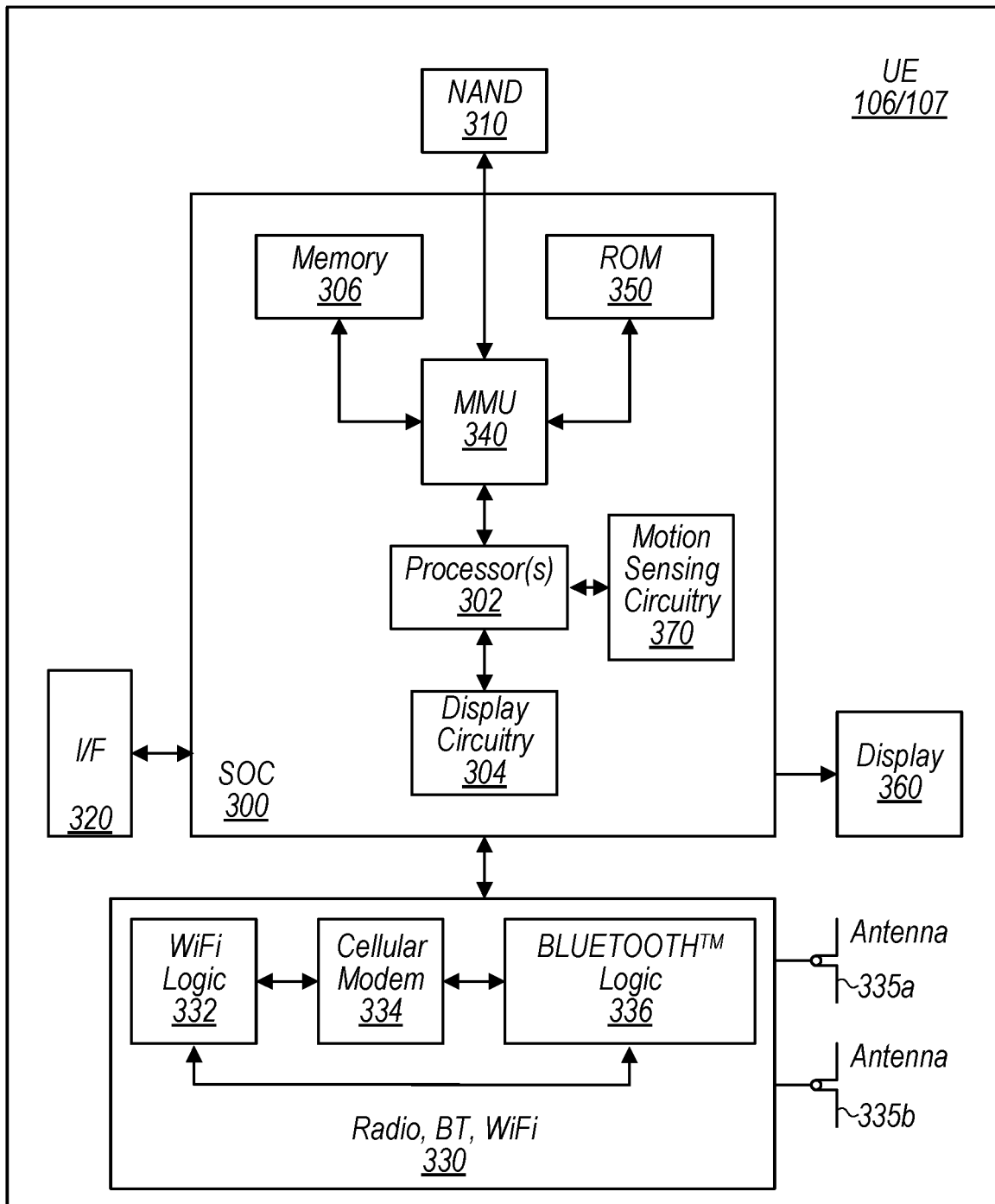
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
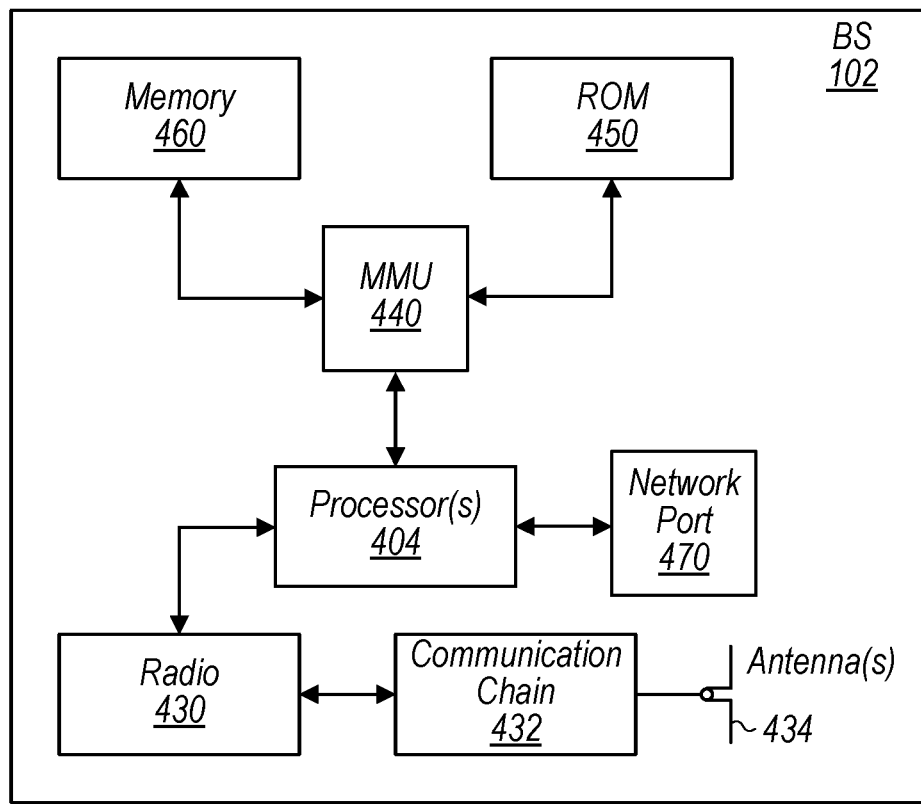
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
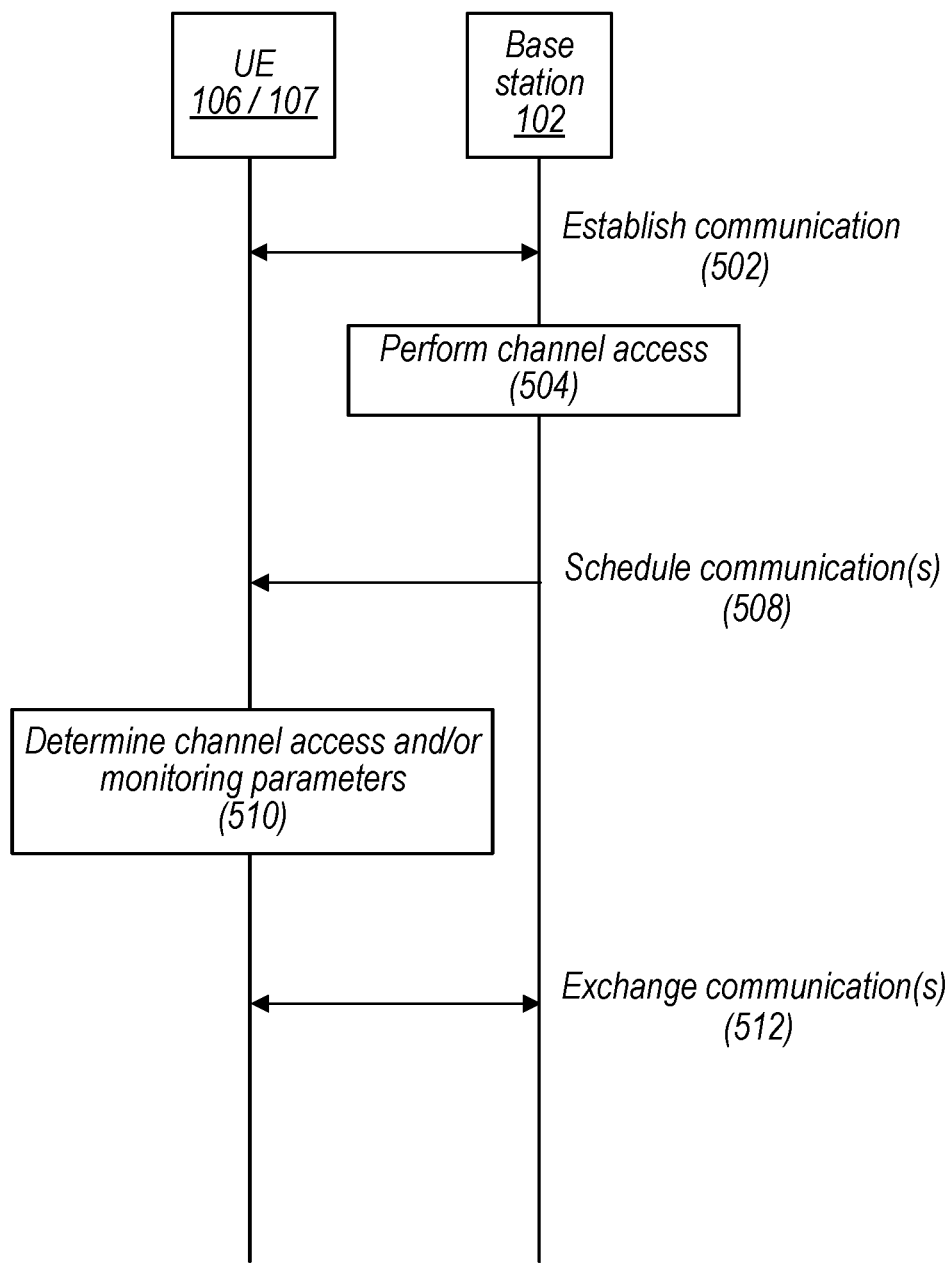
FIG. 5 is a communication flow diagram illustrating an example method for channel access communications, according to some embodiments.

FIG. 5—Channel Access

Channel access mechanisms, such as clear channel assessment (CCA), enhanced CCA (eCCA) (e.g., based on EN 302567), listen before talk (LBT), etc., provide approaches for orderly access of unlicensed spectrum. For example, these channel access mechanisms allow one device to determine whether a wireless medium is in use by another device (e.g., transmitting a potentially interfering signal) prior to transmitting a signal. Channel access mechanisms may or may not incorporate beamforming techniques and may differentiate between frequencies with varying levels of granularity. In other words, channel access may be determined on a frequency-specific basis using directional beams, e.g., potentially including frequency-specific and/or beam-specific determinations of whether a medium is clear.

Various types of channel access including categories of LBT may be used. The different categories of LBT may describe different time sequences of waiting to determine whether a channel or other frequency range is clear. For example, category 2 (CAT2) LBT may refer to "one shot" LBT in which a channel or range may be sensed one time, e.g., for a period of 5 or 8 microseconds, among various possibilities. If the channel is clear for that amount of time, the device may determine that the channel is clear and may perform a transmission. CAT4 LBT may additionally incorporate a random backoff period.

Channel access mechanisms assuming beam-based operation in order to comply with the regulatory requirements applicable to unlicensed spectrum for frequencies between 52.6 GHz and 71 GHz have been discussed. Physical layer procedures may specify both LBT and non-LBT related procedures. In some embodiments, non-LBT may be used with no additional sensing mechanism specified. Omnidirectional channel access, directional channel access, and receiver assistance in channel access may be used. Various energy detection thresholds may be used.

For single carrier transmission, LBT or other channel access may be performed in various ways. As one possibility, a base station or UE may perform LBT over the channel bandwidth (e.g., or a bandwidth part (BWP) bandwidth). As another possibility, a unit bandwidth (e.g., an amount of bandwidth for use in a channel access procedure) may be defined and a base station or UE may perform channel access sensing in all the units (e.g., to be transmitted in) in the channel or BWP bandwidth. Such a unit bandwidth may be determined based on various factors (e.g., as further discussed below) so that the unit bandwidth(s) may vary, according to some embodiments.

For multi-carrier transmission (e.g., in intra-band carrier aggregation), LBT or other channel access may be performed in various ways. As one possibility, a base station or UE may perform multiple LBT procedures (e.g., simultaneously). In other words, one LBT may be performed for each channel bandwidth (e.g., of multiple channels/carriers) separately, thus providing results for each tested bandwidth). As another possibility, a base station or UE may perform a single LBT over all component carriers (CCs), e.g., sensing for an interfering signal on any of the CCs. As another possibility, a unit bandwidth (e.g., an amount of bandwidth for use in an LBT or other channel access procedure) may be defined. A unit bandwidth may be defined per BWP, per channel, per cell, per UE, and/or in any combination of these or other ways. A base station or UE may perform LBT in all the LBT units to be transmitted in the channel bandwidth in each CC.

It will be appreciated that the various possibilities described above may be combined as desired. For example, multiple approaches for multi-carrier transmission channel access may be supported by devices as disclosed herein. Moreover, use of an LBT unit based approach may be configurable and/or may be used at some times or under some circumstances as discussed below.

One aspect of channel access is the amount of time that a channel may be considered available following a channel access procedure, and how/if that amount of time may be used by different transmitting devices. For example, some standards may include a defined or maximum channel occupancy time (COT). For example, license assisted access (LAA) may include an 8 ms COT, among various possibilities.

In some embodiments, a COT may be shared by different devices (e.g., a base station and a UE) under some circumstances. One possible rule for sharing a COT may include defining a maximum gap, e.g., Y, between transmissions. For example, a later transmission may share a COT with an earlier transmission (e.g., without performing a LBT or other channel access for the later transmission) if the later transmission starts within gap Y form the end of the earlier transmission. As another possible rule, no maximum gap (e.g., Y) may be applied. Accordingly, a later transmission may share a COT (e.g., without a channel access procedure for the later transmission) with an earlier transmission regardless of the gap between the two transmissions (e.g., as long as the later transmission is within the COT). In some embodiments, the gap may be measured from the end of the earlier transmission to the beginning of the later transmission. In some embodiments, the gap may be measured from the end of the earlier transmission to the end of the later transmission. In some embodiments, there may be a defined or default duration of an earlier transmission (e.g., indicated in configuration information); the gap may be measured from the end of the defined/default duration (e.g., which may be different than an actual end of the earlier transmission).

In some embodiments, the entire later transmission must be within the COT.

In some embodiments, in fallback DCI (e.g., format 1-0 and 0-0), 2 bits may be included for a field indicating channel access type and cyclic prefix (CP) extension, according to some embodiments. For example, a field such as ChannelAccess-CPext may be 2 bits indicating combinations of channel access type and CP extension as in Table 7.3.1.1.1-4 for operation in a cell with shared spectrum channel access; 0 bit otherwise. In non-fallback DCI (e.g., format 1-1), ChannelAccess-CPext may include 0, 1, 2, 3 or 4 bits, among various possibilities. The bitwidth for this field may be determined as log 2 (I) bits, where I is the number of entries in the higher layer parameter ul-AccessConfig-ListDCI-1-1 for operation in a cell with shared spectrum channel access; otherwise 0 bit. One or more entries from Table 7.3.1.2.2-6 may be configured by the higher layer parameter ul-AccessConfigListDCI-1-1. In non-fallback DCI (e.g., format 0-1), ChannelAccess-CPext-CAPC may be 0, 1, 2, 3, 4, 5 or 6 bits. The bitwidth for this field may be determined as log 2 (I) bits, where I is the number of entries in the higher layer parameter ul-AccessConfig-ListDCI-0-1 for operation in a cell with shared spectrum channel access; otherwise 0 bit. One or more entries from Table 7.3.1.1.2-35 may be configured by the higher layer parameter ul-AccessConfigListDCI-0-1.

In some embodiments, DL DCI signal channel access may be applied to PUCCH. UL DCI (e.g., DCI scheduling a UL transmission) may signal channel access (e.g., channel access priority class (CAPC), CP extension and/or LBT CAT) for the UL transmission.

FIG. 5 is a communication flow diagram illustrating an example method for performing channel access, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the BS may establish communication (502), according to some embodiments. The UE and the BS may communicate using one or more radio access technologies (RATs), e.g., including NR. The UE and the BS may communicate using any frequency resources, e.g., including NR operations above 52.6 GHz, among various possibilities. The UE and the BS may communicate using one or more frequency carriers, e.g., including licensed and/or unlicensed carriers. The BS may provide one or more cell and/or cell groups and the communication between the UE and the BS may use one or more cell and/or cell group.

The BS may exchange configuration information with the UE. For example, the BS may use radio resource control (RRC) and/or other higher layer signaling to negotiate parameters with the UE and/or to configure the UE. Among various possibilities, the configuration information may include various parameters relevant to channel access techniques such as LBT, eCCA, etc.

As part of the exchange of configuration information, the UE may provide capability information such as a capability report, e.g., relating to its channel access and/or other capabilities. For example, the UE may provide information about the frequency granularity at which it can perform one or more channel access techniques. For example, the UE may indicate whether it is capable of performing channel access of different frequencies (e.g., simultaneously) and/or what unit bandwidth(s) the UE may be able to use for channel access techniques such as LBT (e.g., LBT unit bandwidth(s)). A unit bandwidth may describe the bandwidth on which the device performs sensing during a channel access procedure such as LBT. In other words, a unit bandwidth may be described as a sensing bandwidth. In some embodiments, the unit bandwidth(s) may be less than or equal to a corresponding operating bandwidth, channel bandwidth, and/or BWP bandwidth.

The UE may provide capability information via UE specific signaling, such as RRC, among various possibilities. A capability indicator indicating whether the UE supports use of a unit bandwidth for CCA (and/or other channel access) sensing may be used.

The BS may transmit configuration information to the UE. The configuration may or may not be based on (or responsive to) capability information of the UE. For example, the configuration information may indicate that a parameter (e.g., a unit bandwidth) provided by the UE may be used or that other parameter(s) may be used (e.g., a different unit bandwidth).

The configuration may be cell specific. For example, a unit bandwidth may be cell specific.

The BS may broadcast the configuration information, e.g., as system information. For example, a unit bandwidth may be indicated in a system information block (SIB) transmitted by the BS. For example, one or more information element (IE) such as ServingCellConfigCommon or servingCellConfigCommonSIB may indicate the unit bandwidth or other configuration information. Such information may be provided in a format similar to the following, among various possibilities:

```
ServingCellConfigCommon ::= SEQUENCE {
... ...
channelAccessMode-r17 {
LBTunit ENUMERATED{ ... ... } Optional
}
```

Thus, a UE may acquire the information (e.g., via a SIB or SIBs) while operating in an idle mode.

Alternatively, or additionally, the BS may provide the configuration information using dedicated signaling such as RRC, e.g., while the UE is in a connected mode. For example, a BS may transmit the configuration information to a UE when configuring the UE with one or more secondary cells (SCells), with an additional cell group (e.g., secondary cell group (SCG)), or for SpCells (e.g., master cell group (MCG) and/or SCG). The BS may transmit such information upon reconfiguration with synchronization, among various possibilities. For example, the BS may use UE specific RRC signaling to configure a UE who supports the UE capability of a unit bandwidth with a particular value of the unit bandwidth. The configuration information may be UE specific.

In some embodiments, one or more default configurations (e.g., for unit bandwidth, Y, what channel access procedure is used under what circumstances, etc.) may be established, e.g., by standards. Thus, the configuration information may indicate whether the default is in use (e.g., for the cell or for the particular connection between the UE and BS). For example, a default unit bandwidth for channel access may be a channel bandwidth or a bandwidth of a particular bandwidth part (BWP), e.g., of a default BWP or active BWP, etc.

In some embodiments, a channel access bandwidth may be indicated by the BS and/or negotiated with the UE. A channel access bandwidth may be wider or equal to a unit bandwidth. An operating bandwidth (e.g., of a cell or connection between a UE and a cell, e.g., in unlicensed spectrum) may include any number of channel bandwidths. For example, the channel access bandwidth may be a bandwidth on which LBT or other channel access is performed. However, individual channel access determinations may be based on the unit bandwidth. For example, a UE or BS may determine that one unit bandwidth is clear, but another unit bandwidth within the same channel or BWP is not. Thus, the channel access bandwidth may be a multiple of the unit bandwidth. For example, the channel access bandwidth may be a channel bandwidth or BWP bandwidth.

In some embodiments, channel bandwidth and/or BWP bandwidth may be broadcast as system information. For example, a SIB1 may indicate BWP bandwidth.

In some embodiments, a unit bandwidth may be determined (or indicated) for the BS and a (e.g., potentially different) unit bandwidth may be determined or indicated for the UE. In some embodiments, a unit bandwidth may apply only to the BS, e.g., and may not apply to the UE. In some embodiments, a same unit bandwidth may apply to both the UE and BS. The configuration information may indicate under which of various possible circumstances the UE should (and/or should not) use a unit bandwidth.

For example, the configuration information may indicate that the UE should use a BWP and/or channel bandwidth for channel access sensing and should only transmit if channel access is successful (e.g., for the entire BWP and/or channel). In other words, the unit bandwidth may apply to the BS but not to the UE, e.g., the unit bandwidth may not be specified for the UE and/or it may be the same size as the BWP and/or channel bandwidth.

Alternatively, the configuration information may indicate that the unit bandwidth may apply to both the UE and the BS. As one example, the BS may configure the UE to apply the unit bandwidth for channel access sensing if a grant (e.g., configured grant or dynamic grant) for a UL transmission (e.g., PUSCH and/or PUCCH) is within one unit bandwidth. Otherwise, e.g., if the grant extends to at least two unit bandwidths, the UE may use BWP or channel bandwidth for sensing. As another example, the UE may be configured to perform unit bandwidth based channel access sensing. Thus, the UE may transmit when/if (e.g., only if) all of the unit bandwidths of the grant are successful in the channel access procedure. As another possibility, the UE may be configured to perform unit bandwidth based channel sensing and may use any clear bandwidth(s).

The application or configuration timeline for such configuration information may depend on the method with which the configuration information is exchanged, according to some embodiments. For SIB based signaling, the UE and BS may follow the same rules of system information (SI) modification period as for other SI. For UE specific RRC signaling, the UE and BS may follow RRC signaling application time.

The configuration information may further include one or more timing values. For example, the configuration information may specify a maximum gap, e.g., Y, between transmissions such that the second transmission may be performed without a channel access procedure. Y may be measured in slots, ms, or any other unit of time. Y may depend on various parameters, e.g., which may be set by standards, negotiated in the configuration information, or established by control information (e.g., dynamically). For example, Y may depend on K2, K1, subcarrier spacing (SCS), and/or other factors. K2 may indicate the delay between a scheduling communication and the scheduled communication, e.g., between a DCI containing a grant and the corresponding physical uplink control channel (PUSCH) or physical downlink control channel (PDSCH), etc. K1 may indicate a delay between a data transmission (e.g., PDSCH) and a corresponding acknowledgement (e.g., uplink control information (UCI) and/or physical uplink control channel (PUCCH)). Y may be set directly by the configuration information (e.g., the BS may indicate a value of Y).

In some embodiments, Y may be set as a fixed value. For example, Y may be 3 microseconds, which may be similar to 802.11ad.

In some embodiments, Y may depend on a maximum applicable value of K2. For example, the configuration information and/or a standard may indicate a maximum value of K2, e.g., 32 slots. The length of a slot, and thus the length of Y, may depend on SCS. For example: for 120 KHz SCS, Y may be 4 ms; for 480 KHz SCS, Y may be 1 ms; and/or for 960 KHz SCS, Y may be 0.5 ms, among various possibilities. Thus, the configuration information indicate one or more SCS value and/or K2 value. Based on the SCS and/or K2, the UE and the BS may determine a corresponding value of Y.

In some embodiments, Y may depend on a default value of K2 (e.g., which may be indicated in the configuration information). In some embodiments, when the field indicating an applicable value of K2 is absent the UE may apply the value 1 slot for K2 when PUSCH SCS is 15/30 kHz; the value 2 slots for K2 when PUSCH SCS is 60 kHz, and the value 3 slots for K2 when PUSCH SCS is 120 KHz. Thus, for a 120 KHz SCS, Y may be equal to 3 slots. In some embodiments, for 480 KHz SCS and/or 960 KHz SCS, Y may depend on a processing timeline or delay. Such a processing time may be indicated in the configuration information (e.g., based on a UE capability report and/or information from the BS). In some embodiments, for SCS>120 KHz, Y may be >3 slots.

In some embodiments, different SCS values may apply to different channels (e.g., PUSCH, PDSCH, PUCCH, etc.).

Thus, the UE and/or BS may determine different K2 and/or Y values for different channels.

In some embodiments, Y may depend on a maximum value of K1. The maximum K1 may be 16 slots, among various possibilities. The maximum K1 may be set by RRC and/or may be cell specific.

In some embodiments, Y may be cell specific and/or UE specific. Y may be configured by RRC and/or broadcast (e.g., as SI). In some embodiments, Y may be an integer number of slots. The integer number of slots may depend on SCS. For example, the configuration information may indicate different Y values for different SCS values.

It will be appreciated that the Y, K1 and K2 values discussed herein are examples. In some embodiments, if maximum values of K1 or K2 are increased in future standards and/or defined in multi-slots, the corresponding Y value may take the updated value.

In some embodiments, the configuration information may indicate whether or not (e.g., or under what circumstances) the UE should perform channel access prior to transmitting to the BS (e.g., on an unlicensed channel). In some embodiments, the configuration information may specify types of channel access procedures to be performed in various circumstances.

In some embodiments, the configuration information may indicate whether or not the UE should use a cyclic prefix (CP) extension to fill any gap between a channel access procedure and a UL transmission and/or a length of CP extension to be used.

In some embodiments, the configuration information may indicate a size of a unit bandwidth (e.g., explicitly) and/or may indicate information useable to the UE to determine the size of a unit bandwidth. The size of a unit bandwidth may present a tradeoff between flexibility and complexity. For example, an accuracy requirement may be higher when bandwidth of a unit bandwidth is smaller. A sensing slot may be a fixed duration (e.g., 5 microseconds, as in EN 302 567), regardless of the unit bandwidth. A narrow unit bandwidth may correspond to a tighter energy detect (ED) threshold. A nested structure between unit bandwidth and BWP bandwidth or channel bandwidth may be used, according to some embodiments. In some embodiments, a UE may not expect a unit bandwidth spanning across two BWP bandwidth or channel bandwidth. In some embodiments, the configuration information may indicate a unit bandwidth explicitly. In some embodiments, the configuration information may indicate a minimum unit bandwidth. In some embodiments, multiple unit bandwidths or minimums may be indicated so that the UE may determine an applicable value (or values) based on SCS and/or other factors.

As one possibility, a minimum unit bandwidth may be limited to the minimum channel bandwidth per SCS. For example, a 120 KHz SCS may have a minimum bandwidth of 100 MHz, a 480 KHz SCS may have a minimum bandwidth of 400 MHz, and a 960 KHz SCS may have minimum bandwidth of 400 MHz, etc. Other values may be used as desired.

As another possibility, a minimum unit bandwidth may be limited to the minimum channel bandwidth of all SCS. For example, a minimum unit bandwidth of 100 MHz may be used, e.g., corresponding to 120 KHz SCS.

As another possibility, a unit bandwidth may depend on a BWP (or channel) bandwidth. The unit bandwidth may be determined based on the BWP (or channel) bandwidth divided by an integer (e.g., which may be indicated by the configuration information). For example, if channel bandwidth is 2000 MHz and BWP bandwidth is 500 MHz, and the integer is 4, then the unit bandwidth may be 125 MHz (e.g., 500/4=125). This approach may be combined with another approach (e.g., minimum unit bandwidth based on a minimum channel bandwidth, per SCS or otherwise). For example, a configured minimum (e.g., 100 MHz) may be applied if bandwidth divided by the integer is lower than the configured minimum.

In some embodiments, the configuration information may indicate a length of time to use for a channel access procedure. For example, the configuration information may indicate whether to use a slot time for a CAT2 LBT and/or a deferral time or may specify a different length of time. Different lengths of time may be indicated for different procedures and/or for use under different conditions.

In some embodiments, one BS (e.g., or transmission/reception point (TRP)) may exchange or provide configuration information applicable to communications with a different BS (e.g., or TRP). For example, a BS (e.g., providing master cell) operating in a licensed spectrum may exchange configuration information with a UE for channel access procedures with a different BS (e.g., providing a secondary cell) operating in unlicensed spectrum.

The BS may perform one or more channel access procedure (504), according to some embodiments. For example, the BS may perform channel access in order to determine whether a channel or BWP (or portion thereof, e.g., using a channel access bandwidth and/or unit bandwidth) is clear prior transmitting one or more DL communication to the UE, e.g., on an unlicensed channel(s). The BS may perform any of various types of channel access procedure, e.g., LBT, eCCA, etc. Based on the channel access procedure, the BS may determine frequency resources that are or are not available for transmission, e.g., frequencies that are not or are busy/occupied.

The BS may apply channel access parameters such as a channel access bandwidth and/or unit bandwidth as indicated in the configuration information. For example, the BS may perform the channel access procedure for the channel access bandwidth. The BS may determine whether the medium is clear for any number of unit bandwidths, e.g., making up a channel access bandwidth. For example, the BS may determine that one or more unit bandwidths may be clear and/or one or more (e.g., different) bandwidths may be busy.

In some embodiments, the channel access procedure may be associated with an amount of time that the channel (or portion) may be occupied, e.g., a COT.

The BS may determine to schedule one or more UL and/or DL communication from the UE and may transmit one or more message (e.g., UL and/or DL grant) to the UE to schedule the UL and/or DL communication(s) (508), according to some embodiments. The UL and/or DL communication(s) may be scheduled in the COT and/or outside of the COT.

The BS may transmit one or more DL communication(s) to the UE, according to some embodiments. The DL communication may include data and/or control information (e.g., PDSCH, PDCCH, downlink control information (DCI), etc.). The BS may transmit the DL communication on one or more channel or portions thereof determined to be clear (e.g., in the channel access procedure discussed with respect to 504). The BS may transmit the DL communication during the COT.

UL grant(s) may be transmitted in one or more DCI message and/or other message(s). In some embodiments, the UL grant(s) may be multiplexed with the DL communication(s) or transmitted separately.

In some embodiments, the message(s) may be transmitted on licensed spectrum and/or on unlicensed spectrum different from the spectrum on which the BS performs the channel access procedure of 504. In some embodiments, the message(s) may be transmitted prior to or at the same or overlapping time as the channel access procedure.

In some embodiments, the message(s) may include on or more indications to the UE about channel access. For example, such indication(s) may be in the same or different DCI message(s) than the UL grant(s). Such indication(s) may describe information about the channel access determinations of the BS and/or what, if any, channel access procedure the UE should perform prior to transmitting the UL communication(s). For example, the message(s) may indicate what unit bandwidth(s) the BS used for its channel access, and which unit bandwidth(s) was/were determined to be clear. The messages may indicate COT(s) for the clear unit bandwidth(s).

The message(s) may indicate channel access parameters, e.g., as discussed below.

In some embodiments, no category (CAT) 2 LBT may be used. The message(s) may include a (e.g., 1 bit) indication of whether no channel access (e.g., no LBT) or eCCA. For example, if the UL communication is scheduled within the COT, the message may indicate that the UE does not need to perform any channel access procedure prior to transmitting the UL transmission. The indication may signal to the UE to perform eCCA prior to transmitting the UL communication in the event that the UL communication is scheduled outside of the COT (e.g., in whole or in part) or that the UL communication is not within Y of the DL communication. In other words, if the delay between the DL communication and the UL communication exceeds a threshold (based on the COT and/or Y), the message may indicate that a channel access procedure is to be performed.

In some embodiments, CAT 2 LBT may be used. The message(s) may include a (e.g., 1 bit) indication of whether the UL communication is scheduled within the COT. For example, a 0 value of the indication may indicate that the UL communication is inside the COT. This may indicate to the UE to determine whether CAT2 LBT is needed, e.g., by comparing the configured Y value to the last symbol of the scheduling DCI or last symbol of the DL communication (e.g., PDSCH). If the time difference determined by the comparison is less than Y, then no LBT may be implied. If the time difference determined by the comparison is greater than Y, then CAT2 LBT may be implied. Further, an indication value of 1 may indicate that the UE should use eCCA and/or that the UL communication is scheduled outside of the COT.

In some embodiments, CAT 2 LBT may be used in context of a more detailed indication. The message(s) may include a (e.g., 2 bit) indication of what, if any, channel access procedure is to be used by the UE. For example, value 00 may indicates no LBT or other channel access, value 01 may indicate CAT2 LBT, value 10 may indicate eCCA, and value 11 may be reserved.

In some embodiments, no indication of what, if any, channel access procedure the UE should perform may be included in the message(s). In other words, the UE may be configured to determine the channel access approach based on other information, such as the configuration information.

In some embodiments, the message(s) may indicate whether or not the UE should use a CP extension and/or a length of CP extension to be used.

In some embodiments, the message(s) may include one or more fallback DCI message. A fallback DCI message may be a DCI format that may be used for a UE that is not (e.g., yet or currently) in an RRC connected state. In some embodiments, the message(s) may include one or more non-fallback DCI message, e.g., for a connected UE.

In some embodiments, the message(s) (e.g., fallback DCI) may include a (e.g., 1 bit) indication of whether cross-COT scheduling is enabled (or disabled). Cross-COT scheduling may refer to a UL transmission that is not scheduled within the COT (e.g., determined by the BS in 504 for a DL communication). COT sharing may refer to scheduling the UL transmission within the COT. Thus, if COT sharing is indicated, no additional channel access procedure (e.g., CAT2 LBT) by the UE may be needed.

In some embodiments, the message(s) (e.g., fallback DCI) may not include such an (e.g., 1 bit) indication. The indication may not be included if the BS ensures that the UL transmission is scheduled within the COT. No CP extension may be used in this case. There may be no ambiguity of CoreSet 0 decoding in this case.

In some embodiments, the message(s) (e.g., non-fallback DCI) may include or exclude various parameters depending on the configuration information. For example, if CAT 2 LBT is enabled and CP extension is not enabled (e.g., by the configuration information), then 1 or 2 bits may be configured based on RRC, e.g., to indicate whether CAT2 LBT is to be used. Further, if CAT 2 LBT is enabled and CP extension is enabled, then 1 or 2 bits may jointly encode whether LBT and CP extension is to be used. Further, if CAT 2 LBT is not enabled and CP extension is not enabled, then, e.g., if DCI Format 2-0 is used, no additional bits may be used to indicate whether the UL transmission is during the COT. A 1 bit indication may be included to indicate whether the UL transmission is inside or outside of the COT.

In some embodiments, the messages may include an indication of whether the UL message is scheduled within Y of the DL message. In other words, the BS may perform a determination of whether the UL message is close enough to the DL message to be transmitted without further channel access procedure and may directly indicate this to the UE.

In some embodiments, for scheduling of a DL communication, the BS may use DCI Format 2-0 or similar format(s), e.g., similar to NR-U design. If a unit bandwidth is enabled (e.g., LBT unit) and if cell specific frequency monitoring (e.g., availableRBsetPerCell) is enabled, then any successful unit bandwidth may be signaled in DCI (e.g., format 2-0). If directional channel access (e.g., beamforming LBT) is used, different unit bandwidths may be successful with different sensing beams. The DCI message(s) signal the COT directivity per successful LBT unit. In other words, the DCI may indicate what frequencies are clear (or busy) for what beam(s). For example, the DCI may indicate that resource block (RB) set 1 (e.g., a first unit bandwidth) is clear for a first transmission control indicator (TCI) state list and a second RB set is clear for a second TCI state list. If a TCI state list is not configured, omni directional channel access may be assumed, according to some embodiments. Accordingly, the UE may (e.g., only) monitor the successful LBT unit bandwidth and/or RB sets if indicated and the associated TCI state list is among the UE configured active TCI state list, according to some embodiments.

In some embodiments, the message(s) may indicate one or more Y values, e.g., for the UE to apply in selecting how/if to perform channel access. Y may be indicated dynamically (e.g., in control information, e.g., for particular transmissions) and/or semi-statically.

In some embodiments, the message(s) may indicate a length of time to use for a channel access procedure. For example, the message(s) may indicate whether to use a slot time for a CAT2 LBT and/or a deferral time or may specify a different length of time.

The UE may determine parameters for channel access for UL communication(s) and/or monitoring for DL communication(s) (510), according to some embodiments.

For example, for a UL communication (e.g., scheduled in 508), the UE may determine whether to perform channel access and/or determine relevant channel access parameters. Such channel access parameters may include type of channel access, whether to use a CP extension, what (if any) unit bandwidth(s) to use, TCI state(s) to use for channel access, etc. The UE may determine such parameters, as well as whether or not to perform channel access, based on: configuration information (e.g., as discussed with respect to 502, e.g., to determine a Y value, etc.), any indication(s) included in control information (e.g., as discussed with respect to 508, e.g., to determine timing of the UL communication in relation to a COT and/or a Y value, etc.), standards, etc. For example, if the control information explicitly signals a channel access technique, or that channel access is not needed (e.g., as discussed with respect to 508), the UE may determine to perform a channel access procedure according to such an indication. Further, the UE may determine a type of channel access procedure to perform and/or may determine related parameters such as what frequency range(s) and/or beams to use. The type of channel access and/or related parameters may be determined based on an explicit indication (e.g., from the BS in the control information) and/or based on other factors, possibly in combination with configuration and/or control information.

In some embodiments, control information (e.g., in 508) may not include an indication of whether to perform channel access for the UL communication and/or channel access parameters. Accordingly, the UE may decide the channel access parameters without an indication. For example, the control information (e.g., a DCI format 2-0 message) may include an indication of the COT duration. When DCI 2-0 is configured with COTdurationPerCell, the UE may determine remaining COT duration based on DCI 2-0 decoding. If the UL transmission (e.g., PUSCH/PUCCH) is within COT, and if a relatively brief channel access technique (e.g., CAT2 LBT) is enabled (e.g., based on configuration information and/or other factors), then the UE may determine whether to perform the brief channel access technique based on the configured Y value from the last symbol of scheduling DCI or last symbol of PDSCH. In other words, the UE may make a comparison of the time of the UL transmission to the scheduling control information and/or a downlink transmission within the COT.

Based on the comparison, the UE may determine whether to perform channel access. For example, if the UL transmission is within Y of the control information of DL transmission, the UE may determine not to perform channel access. If the UL transmission is not within Y of the control information of DL transmission, the UE may determine to perform channel access, e.g., using the brief channel access technique. Further, if the UL transmission is within the COT and no brief channel access technique is enabled, the UE may determine not to perform channel access. If the UL transmission is outside of the COT, the UE may determine to perform a lengthier channel access technique, e.g., eCCA.

It will be appreciated that a DL communication against which the UE is measuring timing of the UL communication may be scheduled in 508 and/or based on other control information. For example, the DL communication may occur prior to the scheduling of the UL communication, concurrently, or subsequently.

In the event that the UE determines to perform a particular channel access procedure, the UE may further determine the bandwidth(s) on which to perform the channel access procedure. For example, the UE may determine whether to use a unit bandwidth, BWP bandwidth, and/or channel bandwidth for the procedure. As noted above, configuration information may indicate whether a unit bandwidth is applicable to channel access procedures performed by the UE. Further, the UE may determine the unit bandwidth(s), BWP bandwidth, and/or channel bandwidth(s) to use for the channel access procedure, e.g., based on the control and/or configuration information. For example, the UE may determine whether to use a unit bandwidth and what the size (e.g., bandwidth) of the unit bandwidth is. Further, the UE may determine the particular frequency range(s) to test, e.g., a first unit bandwidth from frequency 1 to frequency 2 and a second unit bandwidth from frequency 3 to frequency 4, etc.

As noted above, in some embodiments, the UE may determine the unit bandwidth based on an indication from the BS (e.g., in configuration information and/or control information). For example, the UE may use static signaling to provide a unit bandwidth in a capability report. Such a unit bandwidth may be larger or smaller than a BWP bandwidth.

In some embodiments, the UE may dynamically determine a unit bandwidth and signal the determined bandwidth to the BS dynamically. For example, the UE may dynamically determine a unit bandwidth and may report the unit bandwidth in uplink control information (UCI) using resources provided by a configured grant for PUSCH. In other words, if the UE can transmit UCI on any unit bandwidth which is successful, the UE may include an indication of the unit bandwidth used in the channel access procedure. The UE may further include an indication of which unit bandwidth(s) were sensed and determined to be clear (and/or busy). This approach may imply that the BS performs blind decoding of the UL transmission (e.g., PUSCH and/or PUCCH including the UCI and/or other UL data). In some embodiments, the UE may not indicate the unit bandwidth used, e.g., even if the UE dynamically determines the unit bandwidth.

In some embodiments, the UE may determine an amount of time (e.g., a slot time, deferral time, or other amount of time) to use for a channel access procedure. Similarly, the UE may determine an ED threshold for the procedure. These determinations may be based on the control information, configuration information, and/or other factors.

The UE may perform the channel access procedure, e.g., in response to a determination that a channel access procedure is appropriate. The UE may use the determined bandwidth(s), type, and other parameters, as applicable.

As an example of determining parameters for reception of a DL message, the UE may determine what beam and/or frequency range(s) (e.g., unit bandwidth(s)) to use for monitoring for a DL transmission. For example, as noted above, the BS may perform channel access procedure (e.g., 504) and include in control information (e.g., 508) indication(s) of frequency range(s) and/or beam(s) that it successfully determined to be clear. Based on such indication(s) (e.g., in combination with a DL grant or other indication that a transmission is expected), the UE may monitor the indicated beam(s) and/or frequency range(s). In other words, the UE may determine the RB set(s) and/or TCI state(s) based on such indication(s).

The UE and BS may exchange UL and/or DL communication(s) (512), according to some embodiments.

To perform any DL reception(s), the UE may monitor the beam(s) and/or frequency range(s) determined (e.g., in 510).

To perform any UL transmission(s), the UE may apply the results of any channel access procedure performed (e.g., by the UE in 510 and/or by the BS in 504 with results indicated in 508). For example, the UE may transmit the UL transmission on frequency resources and/or beams determined to be clear. The UE may further include one or more indications of the channel access procedure performed, results, and/or parameters used.

As noted above, it will be appreciated that elements of FIG. 5 may be performed in various orders, omitted, etc. As one example, the BS may perform the channel access procedure in 504 and use the determined channel access information (e.g., what frequencies and/or beams are or are not busy) to schedule UL communications and/or to provide to the UE for previously scheduled UL and/or DL communications.

As another example, the BS may not schedule any UL communication and the UE may use channel access parameters, e.g., indicated by the BS in 508, to assist in reception of a DL communication and/or monitoring for future transmissions from the BS. The BS may perform the channel access in 504 and indicate, in 508, a combination of successful (e.g., clear) beams and/or frequencies. The UE may determine to use the successful beams and/or frequencies (or a subset thereof) for monitoring or receiving future communications from the BS. For example, the UE may use (e.g., only) successful beams for monitoring PUCCH, e.g., for a remainder of a COT.

As another example, the BS may schedule (e.g., in 508) both a DL and a UL communication. The UE may (e.g., in 510) use a time of the DL communication for determining whether or not the UL communication is close enough to the time of the DL communication to be sent without the UE performing a channel access procedure. The determination of whether to perform the channel access procedure may be performed based on the scheduled time of the DL communication and/or the actual time of the DL communication. Thus, the determination of whether to perform the channel access procedure may be performed prior to receiving the DL communication, concurrently, or subsequently to receiving the DL communication. The determination of whether to perform the channel access procedure may be performed with or without decoding the DL communication.

FIGS. 6-13—Channel access procedures

Figure 6:
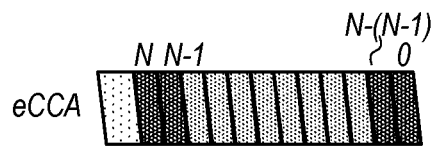
FIGS. 6-19 illustrate aspects of channel access communications, according to some embodiments.

FIG. 6 illustrates an eCCA procedure, according to some embodiments. A device may wait a first (e.g., 8 microsecond, in the illustrated example) deferral time while sensing a frequency range (e.g., a unit bandwidth, BWP bandwidth, channel bandwidth, etc.). If no transmission (or noise, etc., e.g., greater than an ED threshold) are detected on the frequency range during the deferral period, the device may wait for a random and/or configurable number (e.g., N) of slots while continuing to sense the frequency range. The slots may comprise 5 microseconds (e.g., per slot), according to some embodiments. If no transmission (e.g., greater than the ED threshold) is detected during the number of slots, the device may determine that the frequency range is available (e.g., at least for the beam used for the eCCA procedure) and may perform a transmission.

Figure 7:
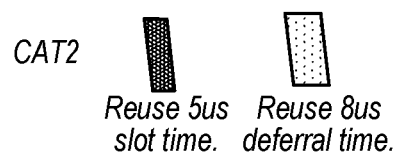

FIG. 7 illustrates two options for a CAT2 LBT procedure, according to some embodiments. In one option, the device may use the slot time (e.g., 5 microseconds) as a listening period. In another option, the device may use the deferral time (e.g., 8 microseconds) as a listening period. If no transmission (or noise, etc., e.g., greater than an ED threshold) are detected on the frequency range during the listening period, the device may determine that the frequency range is available (e.g., at least for a beam in use) and may perform a transmission.

Figure 8:
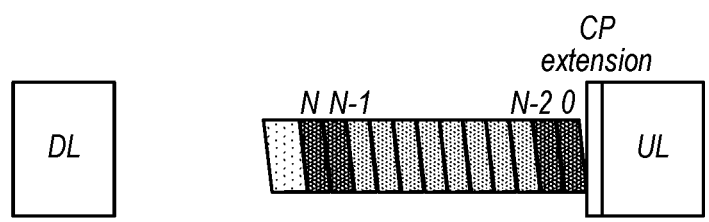

FIG. 8 illustrates an eCCA procedure between a DL and UL transmission, with a CP extension, according to some embodiments. A UE may receive a DL transmission prior to a scheduled UL transmission. The UE may determine to perform an eCCA prior to the UL transmission (e.g., based on the UL transmission occurring outside of a COT associated with the DL transmission, and/or any of the other reasons discussed herein). The UE may perform the eCCA procedure and may determine that the frequency range is available. The UE may determine to use a CP extension to reserve the frequency range between the end of the eCCA procedure and the beginning of the UL transmission. The determination to use the CP extension may be based on the configuration information, control information, and/or other factors.

Figure 9:
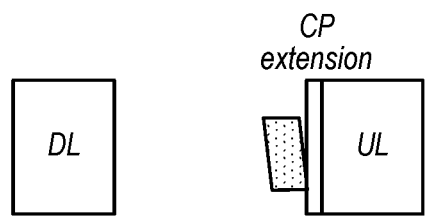

FIG. 9 illustrates a CAT2 LBT procedure using a deferral time between a DL and UL transmission, with a CP extension, according to some embodiments. A UE may receive a DL transmission prior to a scheduled UL transmission. The UE may determine to perform CAT2 LBT prior to the UL transmission (e.g., based on the UL transmission occurring inside of a COT associated with the DL transmission but greater than Y after the DL transmission, and/or any of the other reasons discussed herein). The UE may further determine to use the deferral time (e.g., 8 microseconds) for the LBT procedure, e.g., based on configuration information, control information, or other factors. The UE may perform the CAT2 LBT procedure using the deferral time and may determine that the frequency range is available. The UE may determine to use a CP extension to reserve the frequency range between the end of the LBT procedure and the beginning of the UL transmission. The determination to use the CP extension may be based on the configuration information, control information, and/or other factors.

Figure 10:
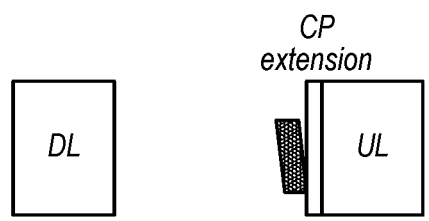

FIG. 10 illustrates a CAT2 LBT procedure using a slot time between a DL and UL transmission, with a CP extension, according to some embodiments. A UE may receive a DL transmission prior to a scheduled UL transmission. The UE may determine to perform CAT2 LBT prior to the UL transmission (e.g., based on the UL transmission occurring inside of a COT associated with the DL transmission but greater than Y after the DL transmission, and/or any of the other reasons discussed herein). The UE may further determine to use the slot time (e.g., 5 microseconds) for the LBT procedure, e.g., based on configuration information, control information, or other factors. The UE may perform the CAT2 LBT procedure using the slot time and may determine that the frequency range is available. The UE may determine to use a CP extension to reserve the frequency range between the end of the LBT procedure and the beginning of the UL transmission. The determination to use the CP extension may be based on the configuration information, control information, and/or other factors.

Figure 11:
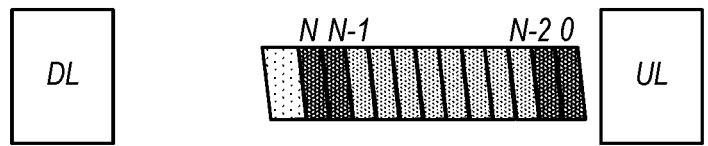

FIG. 11 illustrates an eCCA procedure between a DL and UL transmission, without a CP extension, according to some embodiments. A UE may receive a DL transmission prior to a scheduled UL transmission. The UE may determine to perform an eCCA prior to the UL transmission (e.g., based on the UL transmission occurring outside of a COT associated with the DL transmission, and/or any of the other reasons discussed herein). The UE may perform the eCCA procedure and may determine that the frequency range is available. The UE may determine not to use a CP extension to reserve the frequency range between the end of the eCCA procedure and the beginning of the UL transmission. The determination not to use the CP extension may be based on the configuration information, control information, and/or other factors.

Figure 12:
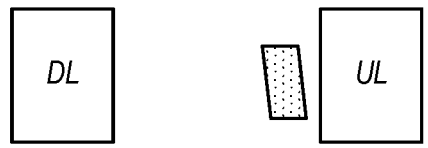

FIG. 12 illustrates a CAT2 LBT procedure using a deferral time between a DL and UL transmission, without a CP extension, according to some embodiments. A UE may receive a DL transmission prior to a scheduled UL transmission. The UE may determine to perform CAT2 LBT prior to the UL transmission (e.g., based on the UL transmission occurring inside of a COT associated with the DL transmission but greater than Y after the DL transmission, and/or any of the other reasons discussed herein). The UE may further determine to use the deferral time (e.g., 8 microseconds) for the LBT procedure, e.g., based on configuration information, control information, or other factors. The UE may perform the CAT2 LBT procedure using the deferral time and may determine that the frequency range is available. The UE may determine not to use a CP extension to reserve the frequency range between the end of the LBT procedure and the beginning of the UL transmission. The determination not to use the CP extension may be based on the configuration information, control information, and/or other factors.

Figure 13:

FIG. 13 illustrates a CAT2 LBT procedure using a slot time between a DL and UL transmission, without a CP extension, according to some embodiments. A UE may receive a DL transmission prior to a scheduled UL transmission. The UE may determine to perform CAT2 LBT prior to the UL transmission (e.g., based on the UL transmission occurring inside of a COT associated with the DL transmission but greater than Y after the DL transmission, and/or any of the other reasons discussed herein). The UE may further determine to use the slot time (e.g., 5 microseconds) for the LBT procedure, e.g., based on configuration information, control information, or other factors. The UE may perform the CAT2 LBT procedure using the slot time and may determine that the frequency range is available. The UE may determine not to use a CP extension to reserve the frequency range between the end of the LBT procedure and the beginning of the UL transmission. The determination not to use the CP extension may be based on the configuration information, control information, and/or other factors.

FIGS. 14-18—Unit bandwidth examples

Figure 14:
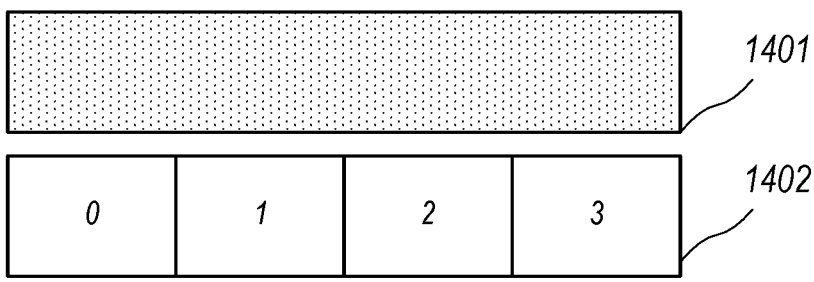
Figure 14:
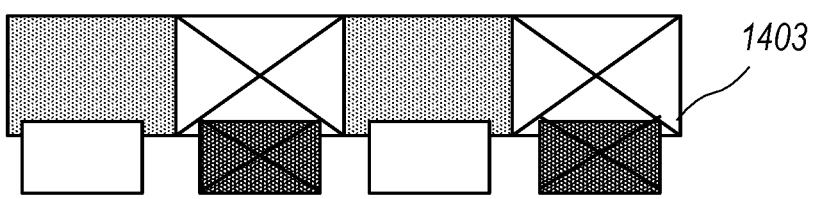

FIG. 14 illustrates a channel access procedure for a DL transmission using a unit bandwidth, according to some embodiments. As shown a channel bandwidth or BWP bandwidth 1401 may be divided into four unit bandwidths: 0, 1, 2, and 3 (1402). The BS may sense the four unit bandwidths (e.g., individually; simultaneously) and may determine that unit bandwidths 0 and 2 are clear and bandwidths 1 and 3 are busy (1403). The determination that unit bandwidths 1 and 3 are busy may be based on the detection of transmissions and/or noise on those unit bandwidths. The transmissions and/or noise may be detected at any frequency (or frequencies) within the respective unit bandwidths. The transmissions and/or noise may exceed an energy detection (ED) threshold. Accordingly, the BS may schedule and transmit the DL transmission to the UE on bandwidths 0 and 2.

Figure 15:
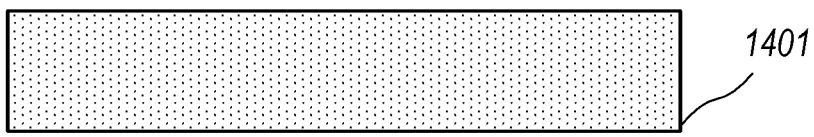
Figure 15:
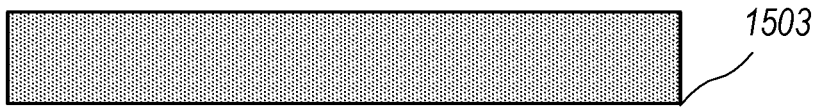

FIG. 15 illustrates a channel access procedure for a UL transmission using a channel or BWP bandwidth, according to some embodiments. As shown a channel bandwidth or BWP bandwidth 1401 may not be divided (for purposes of the illustrated UL transmission and/or channel access procedure) into smaller unit bandwidths. For example, the UE may not be configured to use unit bandwidths or the unit bandwidth may be the same as the channel or BWP bandwidth. The UE may sense the channel or BWP bandwidth and may determine that the channel or BWP bandwidth is clear (1503). Accordingly, the UE may transmit the UL transmission to the BS on the channel or BWP bandwidth. The UE may use the entire channel or BWP bandwidth or any subset of the bandwidth (1505). For example, the UE may use a subset of the bandwidth as indicated in a UL grant corresponding to the UL transmission.

Figure 16:
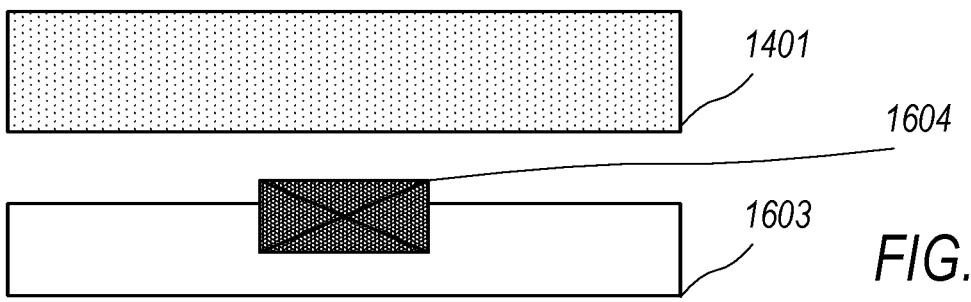

FIG. 16 illustrates an unsuccessful channel access procedure for a UL transmission using a channel or BWP bandwidth, according to some embodiments. As shown a channel bandwidth or BWP bandwidth 1401 may not be divided (for purposes of the illustrated UL transmission and/or channel access procedure) into smaller unit bandwidths. For example, the UE may not be configured to use unit bandwidths or the unit bandwidth may be the same as the channel or BWP bandwidth. The UE may sense the channel or BWP bandwidth and may determine that the channel or BWP bandwidth is not clear (1603). For example, the UE may detect a transmission and/or noise at any frequency within the channel or BWP bandwidth and may determine that the channel or BWP bandwidth is busy based on the detection. Accordingly, the UE may not transmit the UL transmission to the BS on the channel or BWP bandwidth, e.g., at the illustrated time. For example, the UE may perform a subsequent, successful, channel access procedure prior to transmitting the UL transmission.

Figure 17:
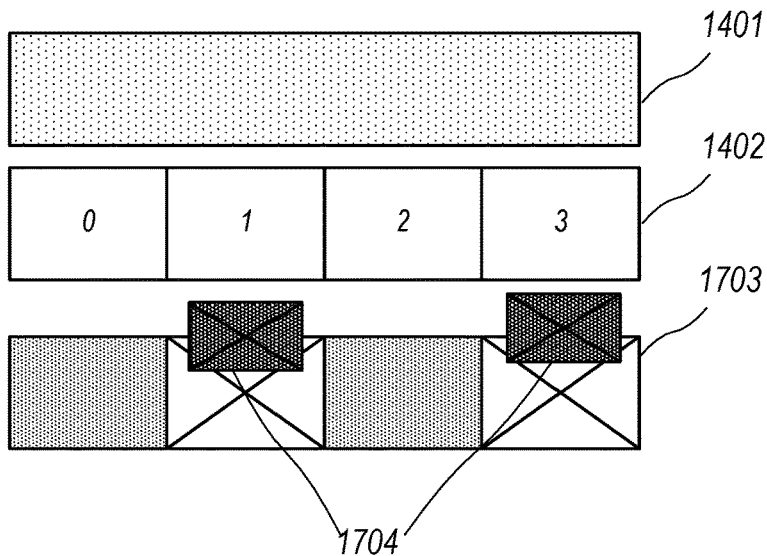

FIG. 17 illustrates a channel access procedure for a UL transmission using a unit bandwidth, according to some embodiments. As shown a channel bandwidth or BWP bandwidth 1401 may be divided into four unit bandwidths: 0, 1, 2, and 3 (1402). The UE may determine to sense the four unit bandwidths (e.g., individually; simultaneously). For example, the UE may be configured to (e.g., by configuration information of 502) use a unit bandwidth if a UL grant indicates resources entirely within a single unit bandwidth. In the illustrated example, a UL grant may schedule the UL transmission entirely within unit bandwidth 1, and in response the UE may determine to use the unit bandwidth for the channel access procedure. In some embodiments, the UE may sense all of the unit bandwidths (e.g., the four unit bandwidths). In some embodiments, the UE may sense only the unit bandwidth(s) associated with the grant, e.g., unit bandwidth 1. The UE may determine that unit bandwidths 0 and 2 are clear and bandwidths 1 and 3 are busy (1703). The determination that unit bandwidths 1 and 3 are busy may be based on the detection of transmissions and/or noise on those unit bandwidths. The transmissions and/or noise may be detected at any frequency (or frequencies) within the respective unit bandwidths. The transmissions and/or noise may exceed an ED threshold. In response to determining that the unit bandwidth associated with the grant (e.g., unit bandwidth 1), the UE may not transmit the UL transmission to the BS, e.g., at the illustrated time. For example, the UE may perform a subsequent, successful, channel access procedure prior to transmitting the UL transmission.

Figure 18:
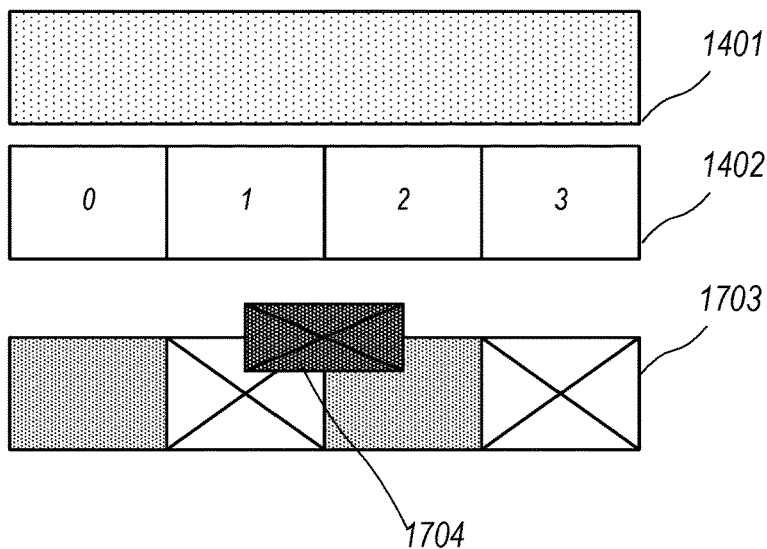

FIG. 18 illustrates a channel access procedure for a UL transmission using a unit bandwidth, according to some embodiments. As shown a channel bandwidth or BWP bandwidth 1401 may be divided into four unit bandwidths: 0, 1, 2, and 3 (1402). The UE may be configured to (e.g., by configuration information of 502) use a unit bandwidth for the UL transmission. In the illustrated example, a UL grant may schedule the UL transmission extending into multiple unit bandwidths, e.g., 1 and 2. In response the UE may determine to use the unit bandwidth for the channel access procedure. In some embodiments, the UE may sense all of the unit bandwidths (e.g., the four unit bandwidths). In some embodiments, the UE may sense only the unit bandwidth(s) associated with the grant, e.g., unit bandwidth 1 and 2. In the illustrated example, the UE may sense the four unit bandwidths (e.g., individually; simultaneously) and may determine that unit bandwidths 0 and 2 are clear and bandwidths 1 and 3 are busy (1803). The determination that unit bandwidths 1 and 3 are busy may be based on the detection of transmissions and/or noise on those unit bandwidths. The transmissions and/or noise may be detected at any frequency (or frequencies) within the respective unit bandwidths. The transmissions and/or noise may exceed an ED threshold. The UE may be configured to (e.g., by configuration information of 502) transmit the UL transmission if all unit bandwidths on which the UL transmission is scheduled (e.g., 1 and 2) are clear, according to some embodiments. Accordingly, the UE may not transmit the UL transmission to the BS, e.g., at the illustrated time. For example, the UE may perform a subsequent, successful, channel access procedure prior to transmitting the UL transmission.

Figure 19:
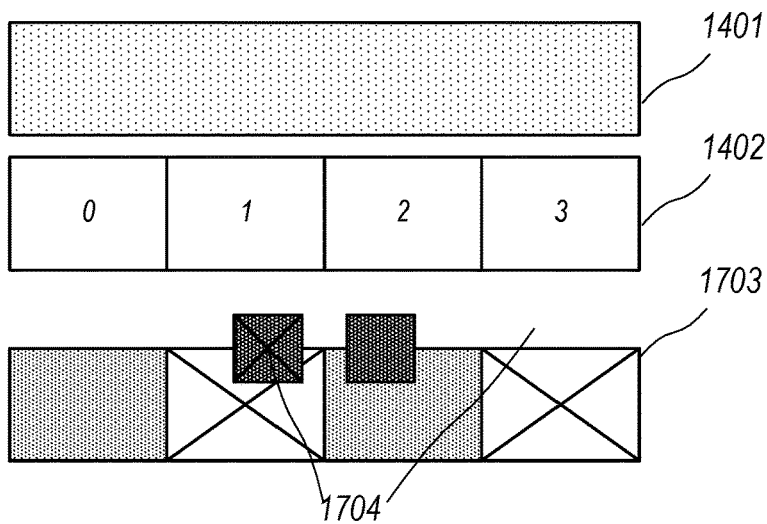

FIG. 19 illustrates a channel access procedure for a UL transmission using a unit bandwidth with unit bandwidth-specific transmission, according to some embodiments. As shown a channel bandwidth or BWP bandwidth 1401 may be divided into four unit bandwidths: 0, 1, 2, and 3 (1402). The UE may be configured to (e.g., by configuration information of 502) use a unit bandwidth for the UL transmission. In the illustrated example, a UL grant may schedule the UL transmission extending into multiple unit bandwidths, e.g., 1 and 2. In response the UE may determine to use the unit bandwidth for the channel access procedure. In some embodiments, the UE may sense all of the unit bandwidths (e.g., the four unit bandwidths). In some embodiments, the UE may sense only the unit bandwidth(s) associated with the grant, e.g., unit bandwidth 1 and 2. In the illustrated example, the UE may sense the four unit bandwidths (e.g., individually; simultaneously) and may determine that unit bandwidths 0 and 2 are clear and bandwidths 1 and 3 are busy (1903). The UE may be configured to (e.g., by configuration information of 502) transmit the UL transmission on any combination or subset of the unit bandwidths on which the UL transmission is scheduled that is/are clear, according to some embodiments. Accordingly, the UE may transmit the UL transmission to the BS using unit bandwidth 2.

ADDITIONAL INFORMATION AND EMBODIMENTS

In some embodiments, the BS may receive an indication of one or more successful unit bandwidth from the UE (e.g., based on a channel access procedure by the UE). The BS may use the successful unit bandwidth(s) for a subsequent DL transmission (e.g., with or without a further channel access procedure).

In a first set of embodiments, an apparatus, may comprise a processor configured to cause a user equipment device (UE) to establish communication with a base station. The processor may cause the UE to exchange, with the base station, configuration information and receive, from the base station, an uplink grant scheduling a first uplink transmission on at least a first part of a first channel. The processor may cause the UE to determine, based on the configuration information, a listen before talk (LBT) unit bandwidth and to perform a LBT procedure using the LBT unit bandwidth on the first channel. The processor may cause the UE to determine that the LBT procedure is successful on at least a first portion of the first channel, wherein the first portion of the first channel has a bandwidth equal to the LBT unit bandwidth; and, in response to the determination that the LBT procedure is successful on at least the first portion of the first channel, transmit, to the base station, the first uplink transmission at least in part on the first portion of the first channel.

In some embodiments, the processor is further configured to cause the UE to determine that the LBT procedure is not successful at least on a second portion of the first channel, wherein the first uplink transmission is not transmitted on the second portion of the first channel, wherein the second portion of the first channel has a bandwidth equal to the LBT unit bandwidth.

In some embodiments, the LBT unit bandwidth is determined based on a minimum channel bandwidth associated with a subcarrier spacing indicated in the configuration information.

In some embodiments, the LBT unit bandwidth is determined based on a bandwidth of a bandwidth part indicated in the configuration information.

In some embodiments, to exchange the configuration information, the processor is further configured to cause the UE to transmit, to the base station a capability report, the capability report including an indication of the LBT unit bandwidth.

In some embodiments, the processor is further configured to cause the UE to transmit, to the base station an indication of the LBT unit bandwidth, wherein the indication of the LBT unit bandwidth comprises uplink control information and is multiplexed with the first uplink transmission.

In some embodiments, the processor is further configured to cause the UE to determine whether the first part of the first channel has a bandwidth within a single unit of the LBT unit bandwidth, wherein performing the LBT procedure using the LBT unit bandwidth on the first channel is in response to a determination that the first part of the first channel has a bandwidth within the single unit of the LBT unit bandwidth.

In some embodiments, the processor is further configured to cause the UE to perform the LBT procedure using a bandwidth of the first channel in response to a determination that the first part of the first channel has a bandwidth that is not within the single unit of the LBT unit bandwidth.

In some embodiments, the first part of the first channel comprises a bandwidth within at least two units of the LBT unit bandwidth, wherein the determination that the LBT procedure is successful on at least the first portion of the first channel comprises a determination that the LBT procedure is successful on each of the at least two units of the LBT unit bandwidth of the first part of the first channel.

In some embodiments, the first part of the first channel comprises a bandwidth within at least two units of the LBT unit bandwidth.

In some embodiments, the first portion of the first channel comprises a first unit of the at least two units of the LBT unit bandwidth.

In some embodiments, the LBT procedure is not successful on a second unit of the at least two units of the LBT unit bandwidth.

In some embodiments, to transmit the first uplink transmission to the base station, the processor is configured to cause the UE not to transmit on the second unit of the at least two units of the LBT unit bandwidth in response to the LBT procedure being not successful on the second unit of the at least two units of the LBT unit bandwidth.

In some embodiments, the LBT unit bandwidth is determined based on cell specific signaling included in the configuration information.

In a second set of embodiments, a user equipment device (UE), may comprise a radio and a processor operably connected to the radio and configured to cause the UE to establish communication with a base station. The processor may be further configured to cause the UE to receive, from the base station, configuration information. The processor may be further configured to cause the UE to receive, from the base station, one or more downlink control information (DCI) messages. The one or more DCI messages may comprise a downlink grant and an uplink grant. The processor may be further configured to cause the UE to determine whether resources for transmission according to the uplink grant occur within a same channel occupancy time (COT) as resources for reception according to the downlink grant. The processor may be further configured to cause the UE to receive, from the base station, a downlink transmission according to the downlink grant. The processor may be further configured to cause the UE to determine whether to perform a listen before talk (LBT) procedure prior to performing transmission according to the uplink grant. The determination of whether to perform the LBT procedure may be based on one or more of: the determination of whether the resources for transmission according to the uplink grant occur within the same COT as the resources for reception according to the downlink grant; the configuration information; one or more indication in one of the one or more DCI messages; and an amount of time between the resources for reception according to the downlink grant and the resources for transmission according to the uplink grant. The processor may be further configured to cause the UE to transmit, to the base station, an uplink transmission according to the uplink grant.

In some embodiments, the UE determines to perform the LBT procedure prior to transmitting the uplink transmission to the base station according to the uplink grant, wherein the processor is further configured to cause the UE to select a type of LBT procedure based on the one or more indication in one of the one or more DCI messages.

In some embodiments, to determine whether to perform the LBT procedure prior to performing transmission according to the uplink grant based on the amount of time between the resources for reception according to the downlink grant and the resources for transmission according to the uplink grant, the processor is further configured to cause the UE to determine a maximum amount of time, Y, between the resources for reception according to the downlink grant and the resources for transmission according to the uplink grant. The processor may be further configured to cause the UE to compare the maximum amount of time, Y, to the amount of time between the resources for reception according to the downlink grant and the resources for transmission according to the uplink grant. If the amount of time between the resources for reception according to the downlink grant and the resources for transmission according to the uplink grant is greater than the maximum amount of time, Y, then the processor may be configured to cause the UE to perform the LBT procedure. If the amount of time between the resources for reception according to the downlink grant and the resources for transmission according to the uplink grant is less than or equal to the maximum amount of time, Y, then the processor is configured to cause the UE to determine not to perform the LBT procedure.

In some embodiments, the maximum amount of time, Y, is determined based on one of: a maximum value of K2, wherein K2 describes a delay between a first DCI message and first uplink transmission scheduled by the first DCI message; a default value of K2; a maximum value of K1, wherein K1 describes a delay between a first downlink transmission and a first uplink transmission comprising acknowledgement of the first downlink transmission; a cell specific value of K1; and a value indicated in the configuration information.

In some embodiments, the UE determines to perform the LBT procedure prior to transmitting the uplink transmission to the base station according to the uplink grant, wherein the processor is further configured to cause the UE to determine whether to transmit a cyclic prefix extension prior to the uplink transmission.

In a third set of embodiments, an apparatus may comprise a processor configured to cause a base station to establish communication with a user equipment device (UE). The processor may be further configured to cause the base station to perform a listen before talk (LBT) procedure and determine that the LBT procedure indicates that at least a first portion of a channel is clear. In response to the determination that at least the first portion of the channel is clear, the base station may transmit, to the UE, on the first portion of the channel, a downlink communication. The processor may be further configured to cause the base station to transmit, to the UE, a downlink control information (DCI) message scheduling an uplink communication and indicating that the first portion of the channel is clear. The processor may be further configured to cause the base station to receive, from the UE, the uplink communication on the first portion of the channel.

In some embodiments, the LBT procedure is performed using a plurality of beams.

In some embodiments, the first portion of the channel is determined to be clear by a first beam of the plurality of beams.

In some embodiments, the first portion of the channel is determined not to be clear by a second beam of the plurality of beams.

In some embodiments, a second portion of the channel is determined to be clear by the second beam.

In some embodiments, the DCI message indicates that the first portion of the channel is clear for a first transmission control indication (TCI) state associated with the first beam, but does not indicate that the first portion of the channel is clear for a second TCI state associated with the second beam. The DCI message may further indicate that the second portion of the channel is clear for the second TCI state.

In some embodiments, the downlink communication is transmitted during a channel occupancy time associated with the LBT procedure and the DCI message includes an indication of whether the uplink communication is scheduled within the channel occupancy time associated with the LBT procedure.

In some embodiments, the DCI message includes an indication of a type of LBT procedure for the UE to perform prior to transmitting the uplink communication.

In some embodiments, the processor is further configured to cause the base station to broadcast system information comprising an indication of a bandwidth associated with LBT procedures.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising circuitry configured to:
    establish communication with a base station;
    exchange, with the base station, configuration information;
    receive, from the base station, an uplink grant scheduling a first uplink transmission on at least a first part of a first channel;
    compare a bandwidth of a bandwidth part indicated in the configuration information divided by an integer greater than 1, and a minimum unit bandwidth based on a minimum channel bandwidth, per subcarrier spacing (SCS);
    determine, based on the configuration information, a listen before talk (LBT) unit bandwidth, wherein the LBT unit bandwidth is the larger of:
        the bandwidth of the bandwidth part indicated in the configuration information divided by the integer greater than 1, and
        the minimum unit bandwidth based on the minimum channel bandwidth, per subcarrier spacing (SCS);
    determine whether a first part of the first channel has a bandwidth within a single unit of the LBT unit bandwidth;
    perform a LBT procedure, wherein the LBT procedure is performed either:
        using the LBT unit bandwidth on the first channel in response to a determination that the first part of the first channel has a bandwidth within the single unit of the LBT unit bandwidth; or
        using a first bandwidth of the first channel in response to a determination that the first part of the first channel has a bandwidth that is not within the single unit of the LBT unit bandwidth;
    determine that the LBT procedure is successful on at least a first portion of the first channel, wherein the first portion of the first channel has a bandwidth equal to the LBT unit bandwidth; and
    in response to the determination that the LBT procedure is successful on at least the first portion of the first channel, transmit, to the base station, the first uplink transmission at least in part on the first portion of the first channel.

2. The processor of claim 1, wherein the circuitry is further configured to:
    determine that the LBT procedure is not successful at least on a second portion of the first channel, wherein the first uplink transmission is not transmitted on the second portion of the first channel, wherein the second portion of the first channel has a bandwidth equal to the LBT unit bandwidth.

3. The processor of claim 1, wherein the circuitry is further configured to:
    transmit, to the base station an indication of the LBT unit bandwidth, wherein the indication of the LBT unit bandwidth comprises uplink control information and is multiplexed with the first uplink transmission.

4. The processor of claim 1, wherein the first part of the first channel comprises a bandwidth within at least two units of the LBT unit bandwidth, wherein the determination that the LBT procedure is successful on at least the first portion of the first channel comprises a determination that the LBT procedure is successful on each of the at least two units of the LBT unit bandwidth of the first part of the first channel.

5. The processor of claim 1, wherein:
the first part of the first channel comprises a bandwidth within at least two units of the LBT unit bandwidth;
the first portion of the first channel comprises a first unit of the at least two units of the LBT unit bandwidth;
the LBT procedure is not successful on a second unit of the at least two units of the LBT unit bandwidth; and
to transmit the first uplink transmission to the base station, the circuitry is configured not to transmit on the second unit of the at least two units of the LBT unit bandwidth in response to the LBT procedure being not successful on the second unit of the at least two units of the LBT unit bandwidth.

6. The processor of claim 1, wherein the LBT unit bandwidth is determined based on cell specific signaling included in the configuration information.

7. A method, comprising:
communicate with a base station;
exchange, with the base station, configuration information;
receive, from the base station, an uplink grant scheduling a first uplink transmission on at least a first part of a first channel;
compare a bandwidth of a bandwidth part indicated in the configuration information divided by an integer greater than 1, and a minimum unit bandwidth based on a minimum channel bandwidth, per subcarrier spacing (SCS);
determine, based on the configuration information, a listen before talk (LBT) unit bandwidth, wherein the LBT unit bandwidth is the larger of:
the bandwidth of the bandwidth part indicated in the configuration information divided by the integer greater than 1, and
the minimum unit bandwidth based on the minimum channel bandwidth, per subcarrier spacing (SCS);
determine whether a first part of the first channel has a bandwidth within a single unit of the LBT unit bandwidth;
perform a LBT procedure, wherein the LBT procedure is performed either:
using the LBT unit bandwidth on the first channel in response to a determination that the first part of the first channel has a bandwidth within the single unit of the LBT unit bandwidth; or
using a first bandwidth of the first channel in response to a determination that the first part of the first channel has a bandwidth that is not within the single unit of the LBT unit bandwidth;
determine that the LBT procedure is successful on at least a first portion of the first channel, wherein the first portion of the first channel has a bandwidth equal to the LBT unit bandwidth; and
in response to the determination that the LBT procedure is successful on at least the first portion of the first channel, transmit, to the base station, the first uplink transmission at least in part on the first portion of the first channel.

8. The method of claim 7, further comprising:
determine that the LBT procedure is not successful at least on a second portion of the first channel, wherein the first uplink transmission is not transmitted on the second portion of the first channel, wherein the second portion of the first channel has a bandwidth equal to the LBT unit bandwidth.

9. The method of claim 7, further comprising:
transmit, to the base station an indication of the LBT unit bandwidth, wherein the indication of the LBT unit bandwidth comprises uplink control information and is multiplexed with the first uplink transmission.

10. The method of claim 7, wherein the first part of the first channel comprises a bandwidth within at least two units of the LBT unit bandwidth, wherein the determination that the LBT procedure is successful on at least the first portion of the first channel comprises a determination that the LBT procedure is successful on each of the at least two units of the LBT unit bandwidth of the first part of the first channel.

11. The method of claim 7, wherein:
the first part of the first channel comprises a bandwidth within at least two units of the LBT unit bandwidth;
the first portion of the first channel comprises a first unit of the at least two units of the LBT unit bandwidth;
the LBT procedure is not successful on a second unit of the at least two units of the LBT unit bandwidth; and
to transmit the first uplink transmission to the base station further comprises determining not to transmit on the second unit of the at least two units of the LBT unit bandwidth in response to the LBT procedure being not successful on the second unit of the at least two units of the LBT unit bandwidth.

12. The method of claim 7, wherein the LBT unit bandwidth is determined based on cell specific signaling included in the configuration information.

13. A method, comprising:
communicate with a user equipment (UE);
exchange, with the UE, configuration information, wherein the configuration information is useable to:
compare a bandwidth of a bandwidth part indicated in the configuration information divided by an integer greater than 1, and a minimum unit bandwidth based on a minimum channel bandwidth, per subcarrier spacing (SCS);
determine, based on the configuration information, a listen before talk (LBT) unit bandwidth, wherein the LBT unit bandwidth is the larger of:
the bandwidth of the bandwidth part indicated in the configuration information divided by the integer greater than 1, and
the minimum unit bandwidth based on the minimum channel bandwidth, per subcarrier spacing (SCS); and
determine whether a first part of a first channel has a bandwidth within a single unit of the LBT unit bandwidth;
transmit, to the UE, an uplink grant scheduling a first uplink transmission on at least the first part of the first channel; and
receive, from the UE, the first uplink transmission at least in part on a first portion of the first channel, wherein the first portion of the first channel has a bandwidth equal to the LBT unit bandwidth, wherein a LBT procedure is successful on at least the first portion of the first channel, wherein the LBT procedure is performed either:
using the LBT unit bandwidth on the first channel in response to a determination that the first part of the first channel has a bandwidth within the single unit of the LBT unit bandwidth; or using a first bandwidth of the first channel in response to a determination that the first part of the first channel has a bandwidth that is not within the single unit of the LBT unit bandwidth.

14. The method of claim 13, further comprising:
receive, from the UE, an indication of the LBT unit bandwidth, wherein the indication of the LBT unit bandwidth comprises uplink control information and is multiplexed with the first uplink transmission.

15. The method of claim 13, wherein the LBT unit bandwidth is determinable based on cell specific signaling included in the configuration information.

16. The method of claim 13, wherein the first part of the first channel comprises a bandwidth within at least two units of the LBT unit bandwidth.

17. The method of claim 16, wherein the first portion of the first channel comprises a first unit of the at least two units of the LBT unit bandwidth.

18. The method of claim 17, wherein:
the LBT procedure is not successful on a second unit of the at least two units of the LBT unit bandwidth; and
the first uplink transmission is not received on the second unit of the at least two units of the LBT unit bandwidth.

\* \* \* \* \*